(12) United States Patent
Tanaka et al.

(10) Patent No.: US 11,537,726 B2
(45) Date of Patent: Dec. 27, 2022

(54) SECRET COMPUTATION SYSTEM AND METHOD

(71) Applicant: NIPPON TELEGRAPH AND TELEPHONE CORPORATION, Chiyoda-ku (JP)

(72) Inventors: Satoshi Tanaka, Musashino (JP); Ryo Kikuchi, Musashino (JP); Koji Chida, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 61 days.

(21) Appl. No.: 16/772,543

(22) PCT Filed: Dec. 14, 2018

(86) PCT No.: PCT/JP2018/046130
§ 371 (c)(1),
(2) Date: Jun. 12, 2020

(87) PCT Pub. No.: WO2019/124260
PCT Pub. Date: Jun. 27, 2019

(65) Prior Publication Data
US 2020/0387616 A1  Dec. 10, 2020

(30) Foreign Application Priority Data
Dec. 18, 2017 (JP) .............................. JP2017-241895

(51) Int. Cl.
*G06F 21/60* (2013.01)
(52) U.S. Cl.
CPC .................................. *G06F 21/602* (2013.01)

(58) Field of Classification Search
CPC .................................................... G06F 21/602
See application file for complete search history.

(56) References Cited

U.S. PATENT DOCUMENTS 9,224,000 B1 * 12/2015 Ghetti ................. H04L 63/0478
2012/0159180 A1 * 6/2012 Chase ................. G06F 21/6227
713/184

(Continued)

FOREIGN PATENT DOCUMENTS

JP         2017-28617 A      2/2017
WO    WO 2016/178291 A1    11/2016

OTHER PUBLICATIONS

Satoshi Tanaka et al., "Secure Statistical Computation System on Encrypted Data: An Empirical Study of Secure Regression Analysis for Official Statistics", NTT, Sep. 22, 2017, 16 pages.

(Continued)

*Primary Examiner* — Matthew Smithers
*Assistant Examiner* — Zoha Piyadehghibi Tafaghodi
(74) *Attorney, Agent, or Firm* — Oblon, McClelland, Maier & Neustadt, L.L.P.

(57) ABSTRACT

A secret computation system is a secret computation system for performing computation while keeping data concealed, and comprises a cyphertext generation device that generates cyphertext by encrypting the data, a secret computation device that generates encrypted basic statistics by performing secret computation of predetermined basic statistics using the cyphertext while keeping the cyphertext concealed, and a computation device that generates decrypted basic statistics by decrypting the encrypted basic statistics and performs predetermined computation using the decrypted basic statistics.

6 Claims, 3 Drawing Sheets

(56) References Cited

U.S. PATENT DOCUMENTS

| | | | |
|---|---|---|---|
| 2015/0371059 A1* | 12/2015 | Bilogrevic | H04L 9/085 726/26 |
| 2015/0371062 A1* | 12/2015 | Ito | G06F 21/72 713/164 |
| 2015/0381349 A1* | 12/2015 | Nikolaenko | G06F 21/602 713/189 |
| 2016/0292430 A1* | 10/2016 | Antonopoulos | G06F 21/602 |
| 2017/0147835 A1* | 5/2017 | Bacon | G06F 21/602 |
| 2018/0139045 A1 | 5/2018 | Furukawa et al. | |
| 2018/0225431 A1 | 8/2018 | Ikarashi et al. | |

OTHER PUBLICATIONS

Satoshi Tanaka et al., "Secure statistical computation system on encrypted data: An empirical study of secure regression analysis for official statistics", UNECE Work Session on Statistical Data Confidentiality, Jun. 30, 2017, pp. 1-14.

International Search Report dated Mar. 12, 2019 in PCT/JP2018/046130 filed Dec. 14, 2018, 1 page.

S. Tanaka et al., "Analyzing Microdata of Official Statistic with Secure Computation", with Partial translation, 2017, 10 total pages.

A. Shamir, "How to share a secret", Communications of the ACM, 1979, 22.11: p. 612-613.

C. Gentry, "Fully homomorphic encryption using ideal lattices", In: STOC. 2009. p. 169-178.

Satoshi Tanaka et al., "Secure statistical computation system on encrypted data: An empirical study of secure regression analysis for official statistics", UNECE Work Session on Statistical Data Confidentiality, Sep. 20, 2017, pp. 1-14.

\* cited by examiner

| STATISTIC | SYMBOL AND NOTATION | DEFINITION | EQUIVALENT FORMULA |
|---|---|---|---|
| NUMBER OF RECORDS | $m$ | NUMBER OF ELEMENTS OF "a" OR NUMBER OF ROWS OF "A" | — |
| NUMBER OF ATTRIBUTES | $L$ | NUMBER OF COLUMNS OF "A" | — |
| SUM | $s_a$ | $\sum_{j=1}^{m} a_j$ | — |
| SUM OF SQUARES | $s_{a^2}$ | $\sum_{j=1}^{m} a_j^2$ | — |
| SUM OF PRODUCTS | $s_{ab}$ | $\sum_{j=1}^{m} a_j b_j$ | — |
| MEAN | $\mu_a$ | $\frac{1}{m}\sum_{j=1}^{m} a_j$ | $\frac{1}{m} s_a$ |
| SQUARE MEAN | $\mu_{a^2}$ | $\frac{1}{m}\sum_{j=1}^{m} a_j^2$ | $\frac{1}{m} s_{a^2}$ |
| MEAN OF SUM OF PRODUCTS | $\mu_{ab}$ | $\frac{1}{m}\sum_{j=1}^{m} a_j b_j$ | $\frac{1}{m} s_{ab}$ |
| VARIANCE | $\sigma_a^2$ | $\frac{1}{m}\sum_{j=1}^{m}(a_j - \mu_a)^2$ | $\frac{1}{m} s_{a^2} - \frac{1}{m^2} s_a^2$ |
| COVARIANCE | $\sigma_{a,b}$ | $\frac{1}{m}\sum_{j=1}^{m}(a_j - \mu_a)(b_j - \mu_b)$ | $\frac{1}{m} s_{ab} - \frac{1}{m^2} s_a s_b$ |
| STANDARD DEVIATION | $\sigma_a$ | $\sqrt{\frac{1}{m}\sum_{j=1}^{m}(a_j - \mu_a)^2}$ | $\sqrt{\sigma_a^2}$ |
| CORRELATION COEFFICIENT | $\rho_{a,b}$ | $\frac{\sigma_{a,b}}{\sigma_a \sigma_b}$ | $\frac{\sigma_{a,b}}{\sqrt{\sigma_a^2 \sigma_b^2}}$ |

FIG. 3 ions of the present invention will
SECRET COMPUTATION SYSTEM AND METHOD

TECHNICAL FIELD

The present invention relates to a technical field of secret computation that performs data processing while keeping data concealed. For example, the present invention relates to a technique of secret multivariate analysis.

BACKGROUND ART

As a conventional art of secret computation for performing data processing while keeping data concealed, a technique described in Patent literature 1 is known. In the conventional art of secret computation, the following three phases are performed.

1. Encryption phase: to encrypt data to make it concealed.
2. Secret computation phase: to use an algorithm or a protocol capable of target computation for the original data while keeping the encrypted data, that is, cyphertext as is and to process the cyphertext.
3. Decryption phase: to decrypt the cyphertext obtained as a result of processing in the secret computation phase to obtain a target computation result.

PRIOR ART LITERATURE

Patent Literature

Patent literature 1: Japanese Patent Application Laid-Open No. 2017-028617

SUMMARY OF THE INVENTION

Problems to be Solved by the Invention

The above conventional art performs all of target computation processing in "2. Secret computation phase."

In general, secret computation algorithms are more complicated in processing than algorithms that compute data without encrypting. For this reason, time necessary for processing computation by secret computation algorithms is longer than time necessary for processing computation by plaintext computation algorithms. Therefore, if all algorithms that use complicated computation such as linear regression that requires solving linear equations and principal component analysis that requires computing eigenvalues and eigenvectors of matrices are processed by secret computation, the time required for the processing may become enormous.

An object of the present invention is to provide a secret computation system and method that can perform secret computation at faster speed than before while keeping data concealed.

Means to Solve the Problems

A secret computation system according to one aspect of the present invention is a secret computation system for performing computation while keeping data concealed, comprising a cyphertext generation device that generates cyphertext by encrypting the data, a secret computation device that generates encrypted basic statistics by performing secret computation of predetermined basic statistics using the cyphertext while keeping the cyphertext concealed, and a computation device that generates decrypted basic statistics by decrypting the encrypted basic statistics and performs predetermined computation using the decrypted basic statistics.

Effects of the Invention

It is possible to perform secret computation at faster speed than before while keeping data concealed.

DETAILED DESCRIPTION OF THE EMBODIMENTS

Hereinafter, an embodiment of the present invention will be described with reference to the drawings.

[Notation]

Each of "m" and "L" is a natural number of one or more. A single piece of data is described as "a." An mth order vector is described as $a=(a_1, \ldots, a_m)$. A matrix of m rows and L columns is described as $A=(a_{j,k})_{1 \le j \le m, 1 \le k \le L}$ or $A=(a_1^T, \ldots, a_L^T)$. Furthermore, $a_i (i=1, \ldots, L)$ is an m-dimensional vector. T means transportation of a vector or matrix.

A character "n" is a natural number of one or more. Cyphertext of "a" is described as $[a]=([a]_1, \ldots, [a]_n)$. Here, $[a]_i$ is referred to as an "i-th share." However, when $n=1$, $[a]=[a]_1$. In addition, $[a]=([a]_1, \ldots, [a]_m)$ is cyphertext of an mth order vector a. Similarly, $[A]=([a_{j,k}])_{1 \le j \le m, 1 \le k \le L}$ is cyphertext of a matrix A of in rows and L columns.

The sum $S_a$ of the elements in the vector a is described as the following formula:

$$s_a = \sum_{j=1}^{m} a_j.$$

In addition, a product ab of the elements of the vector a and a vector b is described as the following formula:

$$ab=(a_1 b_1, \ldots, a_m b_m).$$

Furthermore, $a^2=aa$.

[Statistic]

Figure 3:
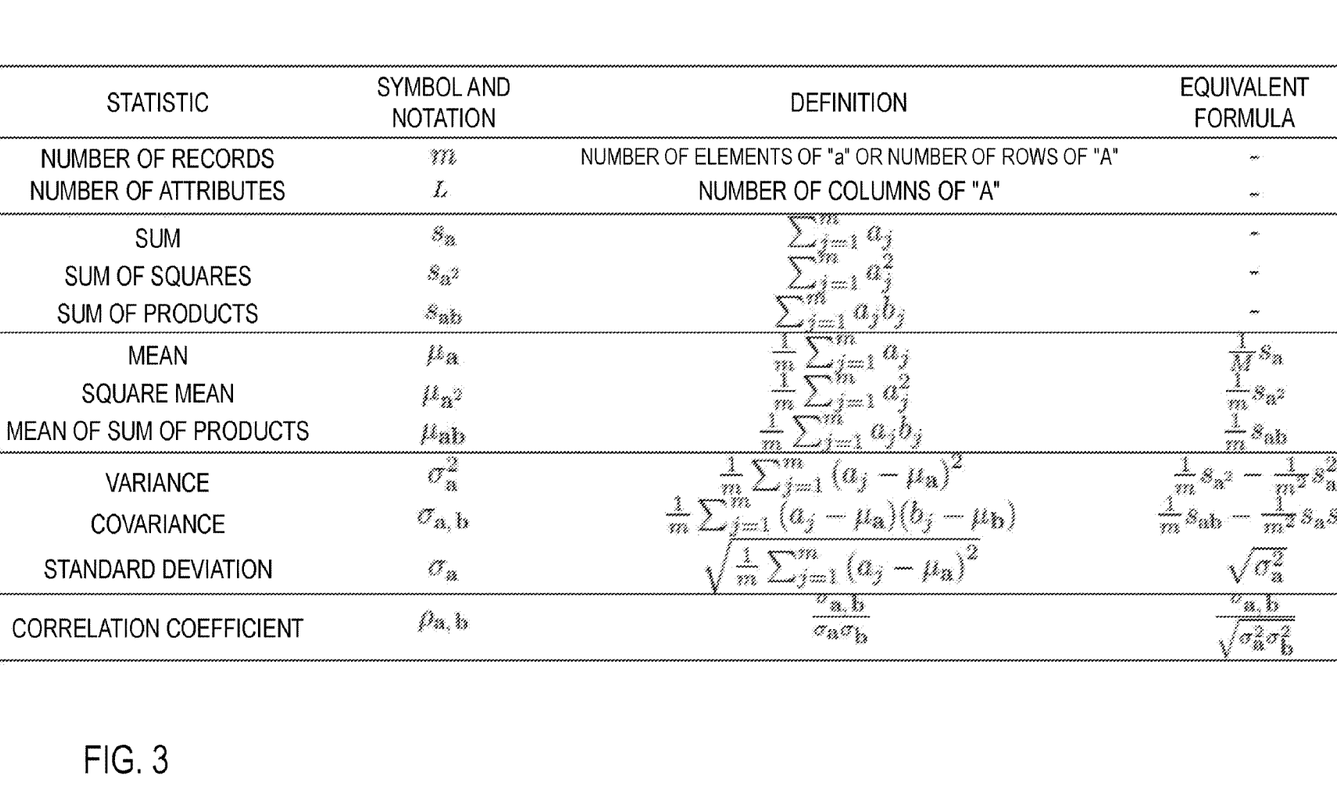
FIG. 3 is a diagram for illustrating a first embodiment.

A quantity indicating a property of "a" or "A" is referred to as a statistic. FIG. 3 shows an example of statistics used in the present invention. FIG. 3 shows the symbol and notation, definition, and formula equivalent to the definition of each statistic.

Among the statistics of FIG. 3, at least one of five statistics of a number of records, a number of attributes, the sum, the sum of squares, and the sum of products is referred to as a basic statistic.

In FIG. 3, the number of records, the number of attributes, the sum, the sum of squares, and the sum of products are defined as follows:

the number of records m: the number of elements of "a" or the number of rows of "A;"
the number of attributes L: the number of columns of "A;"
the sum $s_a$: $\sum_{j=1}^{m} a_j$;
the sum of squares $s_{(a \wedge 2)}$: $\sum_{j=1}^{m} a_j^2$; and
the sum of products $s_{ab}$: $\sum_{j=1}^{m} a_j b_j$.

[Outline of Technique]

The embodiment described later safely computes basic statistics (that is, for example, at least one of the number of records, the number of attributes, the sum, the sum of squares, and the sum of products) by secret computation, and decrypts the basic statistics into plaintext to perform computation such as analysis at high speed. The embodiment described later performs processing divided into the following three phases.

1. Encryption phase: to encrypt data to make it concealed.
2. Secret computation phase: to process computation of the basic statistics from individual pieces of data while keeping cyphertext as is.
3. Computation phase: to decrypt cyphertext of the computed basic statistics and use the decrypted basic statistics to process target computation in plaintext.

The embodiment described later is different from a conventional approach in that secret computation is applied only to computation processes of the basic statistics. By applying this approach, computation, such as linear regression and principal component analysis, that relatively takes time for processing can be processed at higher speed than before.

A linear equation used in linear regression is composed of basic statistics as shown, for example, in the following formula (1).

[Formula 1]

$$\begin{pmatrix} m & s_{a_1} & \cdots & s_{a_L} \\ s_{a_1} & s_{a_1}^2 & \cdots & s_{a_1 a_L} \\ \vdots & \vdots & \ddots & \vdots \\ s_{a_L} & s_{a_L a_1} & \cdots & s_{a_L a_L} \end{pmatrix} \begin{pmatrix} w_0 \\ w_1 \\ \vdots \\ w_L \end{pmatrix} = \begin{pmatrix} s_b \\ s_{a_1 b} \\ \vdots \\ s_{a_L b} \end{pmatrix} \quad (1)$$

Therefore, it is possible to efficiently estimate parameters by, for example, solving a linear equation in plaintext after safely computing basic statistics by secret computation.

In addition, it is possible to implement principal component analysis by performing computation of eigenvalues and eigenvectors for, for example, a variance covariance matrix $V=(\sigma_{a_s}, a_t) 1 \leq s, t \leq L$ or a correlation coefficient matrix $C=(\rho_{a_s}, a_t) 1 \leq s, t \leq L$ of "A".

It is understood from FIG. 3 that variance covariance matrices can be calculated from the basic statistics. Furthermore, also correlation coefficient matrices can be calculated from variance and covariance. Consequently, in the case of using any matrix, if basic statistics can be computed safely, principal component analysis can be achieved by using the computed basic statistics after that.

[Encryption Method]

The present invention uses an encryption method that can carry out, for example, the following arithmetic without decrypting cyphertext. As a measure for implementing such an encryption method, Reference literatures 1 and 2 are known.

1. Addition: to generate a cyphertext [a+b] of addition a+b using [a] and [b] as input.
2. Multiplication: to generate a cyphertext [ab] of multiplication ab using [a] and [b] as input.
3. Sum: to generate a cyphertext $[s_a]$ of sum $s_a$ using [a] as input.
4. Sum of products: to generate a cyphertext $[s_{ab}]$ of sum of products $s_{ab}$ using [a] and [b] as input.

[Reference literature 1] SHAMIR, Adi. "How to share a secret", Communications of the ACM, 1979, 22.11: p. 612-613.

[Reference literature 2] GENTRY, Craig, et al. "Fully homomorphic encryption using ideal lattices", In: STOC. 2009. p. 169-178.

Embodiment

Figure 1:
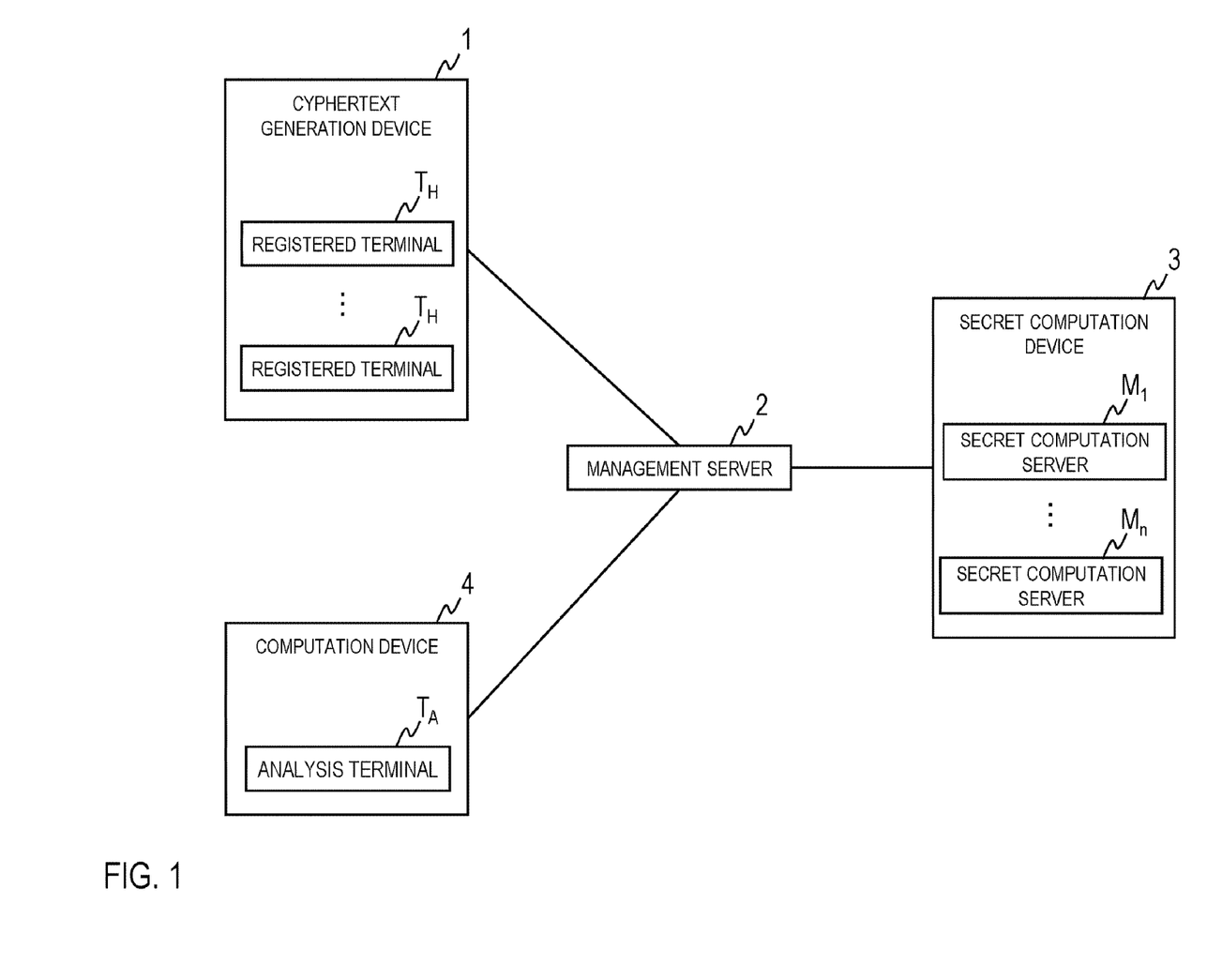
FIG. 1 is a block diagram showing an example of a secret computation system.

The embodiment of a secret computation system includes a cyphertext generation device 1, a management server 2, a secret computation device 3, and a computation device 4 as shown in FIG. 1 as an example. In this example, the cyphertext generation device 1 is a plurality of registered terminals $T_H$. The secret computation device 3 is n secret computation servers $M_1, \ldots, M_n$. The character "n" is a predetermined integer of two or more. Furthermore, the computation device 4 is an analysis terminal $T_A$.

The cyphertext generation device 1, management server 2, secret computation device 3, and computation device 4 can communicate with each other through a network, and can transmit and receive data to/from each other.

The secret computation system uses the secret computation servers $M_1, \ldots, M$ capable of processing the arithmetic described in [Encryption Method]. Each secret computation server $M_i$ (i=1, \ldots, n) can access another secret computation server $M_j$ through the network, and can transmit and receive data to/from each other.

Figure 2:
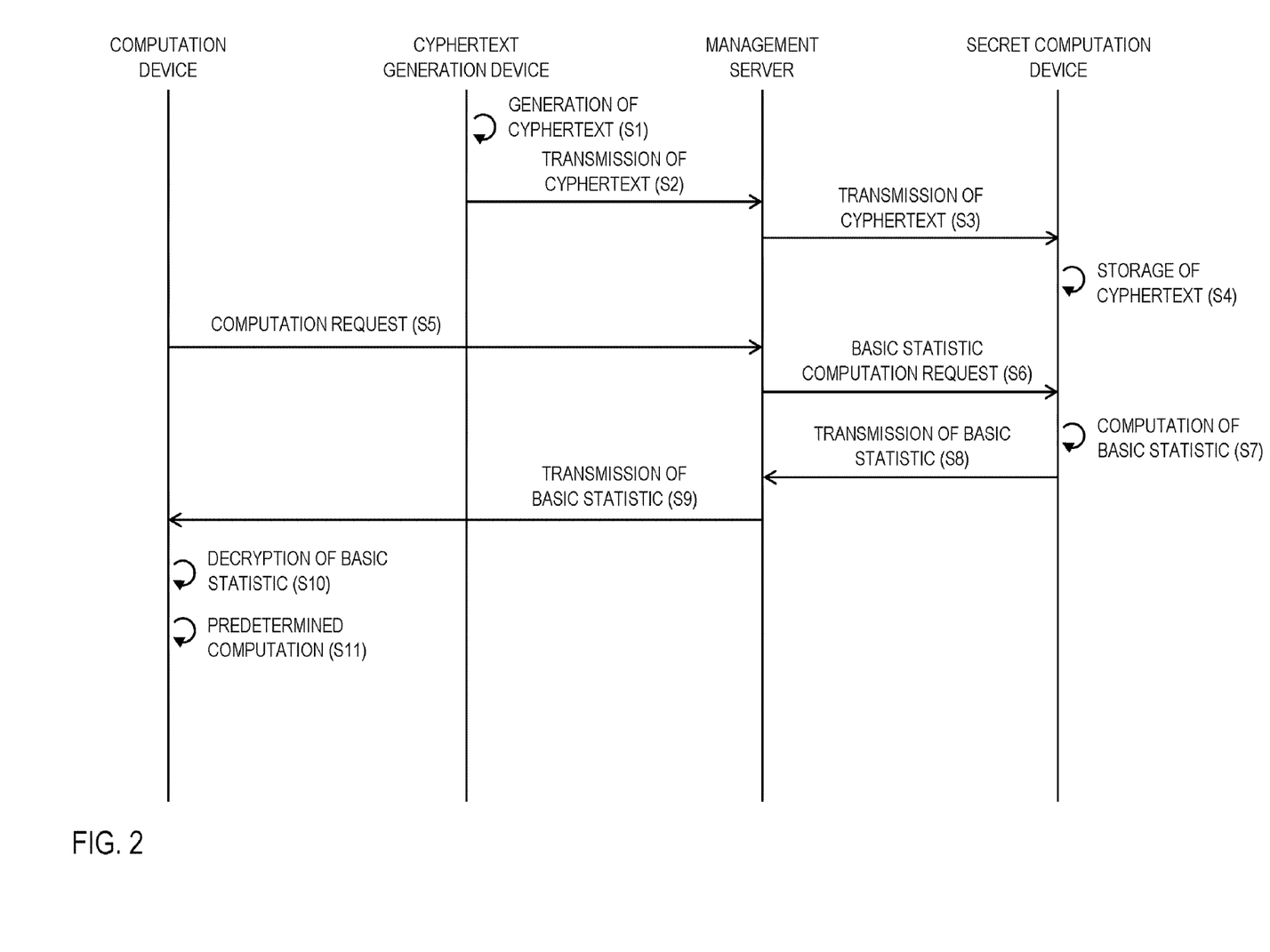
FIG. 2 is a flowchart for illustrating an example of a secret computation method.

A secret computation method is implemented by, for example, the devices included in the secret computation system performing processes of steps S1 to S11 described below and in FIG. 2.

The cyphertext generation device 1 generates cyphertext by encrypting data (step S1). The generated cyphertext is transmitted to the management server 2 (step S2).

The cyphertext generation device is, for example, a plurality of registered terminals $T_H$. In this case, each of the plurality of registered terminals $T_H$ generates a share of data by performing secret distribution of the data held by the own terminal by, for example, an approach described in Reference literatures 1 and 2. The generated share is an example of cyphertext.

The management server 2 transmits the received cyphertext to the secret computation device 3 (step S3).

The secret computation device 3 causes a storage part to store the received cyphertext (step S4). For example, the received cyphertext is stored in an unshown storage part of the secret computation server $M_i$ (i=1, \ldots, n) of the secret computation device 3.

The computation device 4 transmits a computation request to the management server 2 (step S5). The computation device 4 is, for example, an analysis terminal $T_A$. In this case, the analysis terminal $T_A$ transmits an analysis request as the computation request to the management server 2.

The management server 2 transmits a basic statistic computation request which is a computation request for basic statistics necessary for performing computation corresponding to the received computation request to the secret computation device 3 (step S6).

The secret computation device 3 generates encrypted basic statistics by performing secret computation of predetermined basic statistics using the cyphertext read from the storage part while keeping the cyphertext concealed (step S7).

The secret computation device 3 is, for example, secret computation servers $M_1, \ldots, M_n$. In this case, the secret computation servers $M_1, \ldots, M_n$ jointly use, for example, the approach described in Reference literatures 1 and 2 and use the cyphertext read from the storage part to perform secret computation of the predetermined basic statistics while keeping the cyphertext concealed.

The generated encrypted basic statistics are transmitted to the management server 2 (step S8).

The predetermined basic statistics are basic statistics corresponding to the received basic statistic computation request.

The management server 2 transmits the received encrypted basic statistics to the computation device 4 (step S9).

The computation device 4 generates decrypted basic statistics by decrypting the received encrypted basic statistics (step S10).

The computation device 4 uses the decrypted basic statistics to perform predetermined computation (step S11). One of points of the above embodiment lies in a combination of features of analysis that can be calculated only with statistics and the character of secret computation.

Statistics such as the number of records, sum, mean, and variance are not individual pieces of data but numerical values indicating features of a data set. Therefore, analysis that performs computation only using these statistics only needs to solve the data set but does not need individual pieces of data themselves. However, computation of statistics is inevitable from the algorithm of analysis and individual pieces of data must be touched for computing the statistics.

On the other hand, secret computation can safely compute while data is kept concealed by cyphertext, but is generally slower than computation by plaintext. In particular, since speed difference appears remarkably for a complicated computation process such as division, it is costly to implement by secret computation all of analysis requiring complicated computation. On the contrary, the addition and multiplication indicated in the paragraphs of [Encryption Method] are sufficiently fast even in secret computation, and basic statistics based on the arithmetic can be processed at high speed by secret computation.

Therefore, in analysis that can be computed from statistics based on the basic statistics, contents of individual pieces of data are kept concealed by processing only a part where the basic statistics are computed by secret computation, the computed basic statistics are decrypted into plaintext, and thereby the computation of analysis can be processed at high speed. Thereby, analysis with both safety and high speed can be achieved.

In the above embodiment, the management server 2 and computation device 4 are described as separate devices, but the management server 2 and computation device 4 may be implemented in the same device.

EXAMPLE

Example 1

Example 1 is an example in which linear single regression analysis is performed. More specifically, Example 1 is an example in which the analysis terminal $T_A$, which is the computation device 4, uses the n secret computation servers $M_1, \ldots$, which is $M_n$, the secret computation device 3, to estimate parameters $w_0$ and $w_1$ for the following linear model $$b=w_0+w_1a$$

between in households' income data a and expenditure data b held by the registered terminals $T_H$, which is the cyphertext generation device 1.

<Encryption Phase>

As the encryption phase, the following processes are performed in steps S1 to S3.

The registered terminals $T_H$ encrypt "a," "b," and "m" using, for example, the encryption method in Reference literatures 1 and 2.

The registered terminals $T_H$ transmit shares $[a]_i$, $[b]_i$, and $[m]_i$, which are cyphertext, and plaintext in to the secret computation servers $M_1, \ldots M_n$.

<Secret Computation Phase>

As the secret computation phase, the following processes are performed in steps S7 to S9.

Each secret computation server $M_i$ uses $[a]_i$ and $[b]_i$ to find $[s_a]_i$ and $[s_b]_i$ by the secret computation of the sum indicated in the paragraphs of [Encryption Method]. Here, $s_a=\Sigma_{j=1}^m a_j$ assuming that $a=(a_1, \ldots, a_m)$ and $s_b=\Sigma_{j=1}^m b_j$ assuming that $b=(b_1, \ldots, b_m)$.

Each secret computation server $M_i$ uses $[a]_i$ and $[b]_i$ to find $[s_{a\wedge2}]_i$ and $[s_{ab}]_i$ by the secret computation of the sum of products indicated in the paragraphs of [Encryption Method]. Here, $s_{a\wedge2}=\Sigma_{j=1}^m a_j^2$ and $s_{ab}=\Sigma_{j=1}^m a_j b_j$ assuming that $a=(a_1, \ldots, a_m)$ and $b=(b_1, \ldots, b_m)$.

Each secret computation server $M_i$ transmits the found $[s_a]_i$, $[s_b]_i$, $[s_{a\wedge2}]_i$, $[s_{ab}]_i$, and $[m]_i$ to the analysis terminal $T_A$.

<Computation Phase>

As the computation phase, the following processes are performed in steps S10 and S11.

The analysis terminal $T_A$ uses the received shares to decrypt $s_a$, $s_b$, $s_{a\wedge2}$, $s_{ab}$, and m.

The analysis terminal $T_A$ uses $s_a$, $s_b$, and in to compute $\mu_a=(1/m)s_a$ and $\mu_b=(1/m)s_b$.

The analysis terminal $T_A$ uses $s_a$, $s_b$, $s_{a\wedge2}$, $s_{ab}$, and in to compute $\sigma_a^2=(1/m)s_{a\wedge2}-(1/m^2)s_a^2$ and $\sigma_{a,b}=(1/m)s_{ab}-(1/m^2)s_a s_b$.

The analysis terminal $T_A$ calculates $W_1=(\sigma_{a,b})/(\theta_a^2)$.

The analysis terminal $T_A$ calculates $w_0=\mu_b-w_1\mu_a$.

Example 2

Example 2 is an example in which linear regression analysis is performed. More specifically, Example 2 is an example in which the analysis terminal $T_A$, which is the computation device 4, uses the n secret computation servers $M_1, \ldots, M_n$, which is the secret computation device 3, to estimate a parameter $w=(w_0, w_1, \ldots, w_L)$ for the following linear model $$b=w_0+w_1a_1+\ldots+w_La_L$$

between a matrix A of a number of records in and a number of attributes L and a vector b of the number of records in held by the registered terminals $T_H$, which is the cyphertext generation device 1.

<Encryption Phase>

As the encryption phase, the following processes are performed in steps S1 to S3.

The registered terminals $T_H$ encrypt "A," "b," "m," and "L" using, for example, the encryption method in Reference literatures 1 and 2.

The registered terminals $T_H$ transmit shares $[A]_i$, $[b]_i$, $[m]_i$, and $[L]_i$, which are cyphertext, and plaintext m and L to the secret computation servers $M_1, \ldots, M_n$.

<Secret Computation Phase>

As the secret computation phase, the following processes are performed in steps S7 to S9.

Each secret computation server $M_i$ uses $[A]_i$ and $[b]_i$ to find $[s_A]_i=([s_{a1}]_i, \ldots, [s_{aL}]_i)$ and $[s_b]_i$ by the secret computation of the sum indicated in the paragraphs of

[Encryption Method]. Here, $s_{aq}=\Sigma_{j=1}^{m}a_{j,q}$ assuming that $q=1, \ldots, L$, and $s_b=\Sigma_{j=1}^{m}b_j$ assuming that $b=(b_1, \ldots, b_m)$.

Each secret computation server $M_i$ uses $[A]_i$ and $[b]_i$ to calculate $[S_A]_i=([s_{ajak}]_i)_{1\leq j,k\leq L}=$ and $[s_{Ab}]_i$ $([s_{alb}]_i, \ldots, [s_{aLb}]_i)$ by the sum of products indicated in the paragraphs of [Encryption Method]. Here, $s_{ajak}=\Sigma_{r=1}^{m}a_{r,j}a_{r,k}$, and assuming that $q=1, \ldots, L$, $s_{aqb}=\Sigma_{r=1}^{m}a_{r,q}b_r$.

Each secret computation server $M_i$ transmits the found $[s_A]_i$, $[s_b]_i$, $[S_A]_i$, and $[s_{Ab}]_i$, and $[m]_i$ and $[L]_i$ to the analysis terminal $T_A$.

<Computation Phase>

As the computation phase, the following processes are performed in steps S10 and S11.

The analysis terminal $T_A$ uses the received shares to decrypt $s_A$, $s_b$, $S_A$, $s_{Ab}$, m, and L.

The analysis terminal $T_A$ uses $s_a$, $s_b$, $S_A$, $s_{Ab}$, m, and L to compose the linear equation of Formula (1).

The analysis terminal $T_A$ solves Formula (1) using, for example, Gauss' elimination method to find $w=(w_0, \ldots, w_L)$.

Example 3

Example 3 is an example in which principal component analysis is performed. More specifically, Example 3 is an example in which the analysis terminal $T_A$, which is the computation device 4, uses the n secret computation servers $M_1, \ldots, M_n$, which is the secret computation device 3, to performs principal component analysis for data A which is a matrix of a number of records m and a number of attributes L held by the registered terminals $T_H$, which is the cyphertext generation device 1, and finds each principal component $p=(p_1, \ldots, p_L)$.

<Encryption Phase>

As the encryption phase, the following processes are performed in steps S1 to S3.

The registered terminals $T_H$ encrypt "A," "m," and "L" using, for example, the encryption method in Reference literatures 1 and 2.

The registered terminals $T_H$ transmit shares $[A]_i$, $[m]_i$, and $[L]_i$, which are cyphertext, and plaintext "m" and "L" to the secret computation servers $M_1, \ldots, M_n$.

<Secret Computation Phase>

As the secret computation phase, the following processes are performed in steps S7 to S9.

Each secret computation server $M_i$ uses $[A]_i$ to find $[s]_i=([s_{a1}]_i, \ldots, [s_{aL}]_i)$ by the sum indicated in the paragraphs of [Encryption Method]. Here, $s_{ai}=\Sigma_{j=1}^{m}a_{q,j}$ assuming that $q=1, \ldots, L$.

Each secret computation server $M_i$ uses $[A]_i$ to calculate $[S]_i=([s_{ajak}]_i)_{1\leq j,k\leq L}$ by the sum of products indicated in the paragraphs of [Encryption Method]. Here, $s_{ajak}=\Sigma_{r=1}^{m}a_{r,j}a_{r,k}$.

Each secret computation server $M_i$ transmits the found $[s]_i$ and $[S]_i$, and $[m]_i$ and $[L]_i$ to the analysis terminal $T_A$.

<Computation Phase>

As the computation phase, the following processes are performed in steps S10 and S11.

The analysis terminal $T_A$ uses the received shares to decrypt "s," "S," "m," and "L."

The analysis terminal $T_A$ uses "s," "S," "in," and "L" to find $V=(\sigma_{aj,ak})_{1\leq j,k\leq L}=((1/m)s_{ajak}-(1/m^2)s_{aj}s_{ak})_{1\leq j,k\leq L}$.

The analysis terminal $T_A$ uses "V" to find $C=((\sigma_{aj,ak})/(\sigma_{aj}^2\sigma_{ak}^2)^{1/2})_{1\leq j,k\leq L}$. Here, $\sigma_{aj}^2=(1/m)s_{aj\wedge 2}-(1/m^2)s_{aj}^2$ and $\sigma_{ak}^2=(1/m)s_{ak\wedge 2}-(1/m^2)s_{ak}^2$.

The analysis terminal $T_A$ performs computation of eigenvalues and eigenvectors for "C" to find $p=(p_1, \ldots, p_L)$.

[Program and Recording Medium]

For example, if processing in each device is implemented by a computer, processing contents of a function which each part of each device should have are written by a program. Then, the program is executed by the computer and thereby the processing of each device is implemented on the computer.

The program describing the processing contents can be recorded on a computer-readable recording medium. The computer-readable recording medium may be any of, for example, a magnetic recording device, an optical disk, a magneto-optical recording medium, and a semiconductor memory.

The processing of each part may be implemented by executing a predetermined program on the computer, or at least part of the processing may be implemented by hardware.

In addition, it goes without saying that modifications are possible as appropriate within a range not departing from the spirit of the present invention.

What is claimed is:

1. A secret computation system for performing computation while keeping data concealed, comprising:
   a cyphertext generation device that generates cyphertext by encrypting the data;
   a secret computation device that generates encrypted basic statistics by performing secret computation of predetermined basic statistics using the cyphertext while keeping the cyphertext concealed from the secret computation device; and
   a computation device that generates decrypted basic statistics by decrypting the encrypted basic statistics and performs predetermined computation using the decrypted basic statistics,
   wherein the cyphertext generation device, the secret computation device, and the computation device communicate with each other over a network, and
   wherein the predetermined computation is a computation for estimating parameters $w_0$ and $w_1$ for a following linear model $$b=w_0+w_1a$$

between m data a and m data b held by a registered terminals $T_H$,
   the cyphertext generation device is the registered terminals $T_H$,
   the secret computation device is n secret computation servers $M_1, \ldots, M_n$,
   the computation device is an analysis terminal $T_A$,
   cyphertext of "x" is described as $[x]=([x]_1, \ldots, [x]_n)$,
   provided that $i=1, \ldots, n$, the registered terminals $T_H$ generates $[a]_i$, $[b]_i$ and $[m]_i$ as the cyphertext and transmit $[a]_i$, $[b]_i$ and $[m]_i$ and plaintext m to the secret computation servers $M_i$,
   such that each of the secure computation servers $M_i$ receives, over the network, an input of one or more respective shares of original data a and b, and the data a and b are concealed from each of the secure computation servers, provided that $i=1, \ldots, n$, $a=(a_1, \ldots, a_m)$, $b=(b_1, \ldots, b_m)$, $s_a=\Sigma_{j=1}^{m}a_j$, $s_b=\Sigma_{j=1}^{m}b_j$, $s_{a\wedge 2}=\Sigma_{j=1}^{m}a_j^2$ and $s_{ab}=\Sigma_{j=1}^{m}a_jb_j$, the secret computation servers $M_i$ generates $[s_a]_i$, $[S_b]_i$, $[s_{a\wedge 2}]_i$ and $[s_{ab}]_i$ as the basic statistics and transmits $[s_a]_i$, $[S_b]_i$, $[s_{a\wedge 2}]_i$, $[s_{ab}]_i$ and $[m]_i$ to the analysis terminal $T_A$, and the analysis terminal $T_A$ generates $s_a$, $S_b$, $s_{a\wedge 2}$, $s_{ab}$, and m as the decrypted basic statistics and calculates $\mu_a=(1/m)s_a$, $\mu_b=(1/m)s_b$, $\sigma_a^2=(1/m)s_{a\wedge 2}-(1/m^2)s_a^2$, $\sigma_{a,b}=(1/m)s_{ab}-(1/m^2)s_a s_b$ wherein the analysis terminal $T_A$ obtains parameters $w_0$ and $w_1$ for the linear model by calculating $w_0=\mu_b-w_1\mu_a$ and $W_1=(\sigma_{a,b})/(\sigma_a^2)$.

2. A secret computation method for performing computation while keeping data concealed, comprising:

a cyphertext generation step in which a cyphertext generation device generates cyphertext by encrypting the data;

a secret computation step in which a secret computation device generates encrypted basic statistics by performing secret computation of predetermined basic statistics using the cyphertext while keeping the cyphertext concealed from the secret computation device; and a computation step in which a computation device generates decrypted basic statistics by decrypting the encrypted basic statistics and performs predetermined computation using the decrypted basic statistics, wherein the cyphertext generation device, the secret computation device, and the computation device communicate with each other over a network, and wherein the predetermined computation is a computation for estimating parameters $w_0$ and $w_1$ for a following linear model $$b=w_0+w_1 a$$

between m data a and m data b held by a registered terminals $T_H$, the cyphertext generation device is the registered terminals $T_H$, the secret computation device is n secret computation servers $M_1, \ldots, M_n$, the computation device is an analysis terminal $T_A$, cyphertext of "x" is described as $[x]=([x]_1, \ldots, [x]_n)$, provided that $i=1, \ldots, n$, the registered terminals $T_H$ generates $[a]_i$, $[b]_i$ and $[m]_i$ as the cyphertext and transmit $[a]_i$, $[b]_i$ and $[m]_i$ and plaintext m to the secret computation servers $M_i$, such that each of the secure computation servers $M_i$ receives, over the network, an input of one or more respective shares of original data a and b, and the data a and b are concealed from each of the secure computation servers, provided that $i=1, \ldots, n$, $a=(a_1, \ldots, a_m)$, $b=(b_1, \ldots, b_m)$, $s_a=\Sigma_{j=1}^m a_j$, $s_b=\Sigma_{j=1}^m b_j$, $s_{a\wedge 2}=\Sigma_{j=1}^m a_j^2$ and $s_{ab}=\Sigma_{j=1}^m a_j b_j$, the secret computation servers $M_i$ generates $[s_a]_i$, $[S_b]_i$, $[s_{a\wedge 2}]_i$ and $[s_{ab}]_i$ as the basic statistics and transmits $[s_a]_i$, $[S_b]_i$, $[s_{a\wedge 2}]_i$, $[s_{ab}]_i$ and $[m]_i$ to the analysis terminal $T_A$, and the analysis terminal $T_A$ generates $s_a$, $S_b$, $s_{a\wedge 2}$, $s_{ab}$ and m as the decrypted basic statistics and calculates $\mu_a=(1/m)s_a$, $\mu_b=(1/m)s_b$, $\sigma_a^2=(1/m)s_{a\wedge 2}-(1/m^2)s_a^2$, $\sigma_{a,b}=(1/m)s_{ab}-(1/m^2)s_a s_b$, wherein the analysis terminal TA obtains parameters $w_0$ and $w_1$ for the linear model by calculating $w_0=\mu_b-w_1\mu_a$ and $W_1=(\sigma_{a,b})/(\sigma_a^2)$.

3. A secret computation system for performing computation while keeping data concealed, comprising:

a cyphertext generation device that generates cyphertext by encrypting the data;

a secret computation device that generates encrypted basic statistics by performing secret computation of predetermined basic statistics using the cyphertext while keeping the cyphertext concealed from the secret computation device; and a computation device that generates decrypted basic statistics by decrypting the encrypted basic statistics and performs predetermined computation using the decrypted basic statistics, wherein the cyphertext generation device, the secret computation device, and the computation device communicate with each other over a network, and wherein the predetermined computation is a computation for estimating a parameter $w=(w_0,w_1,\ldots,w_L)$ for the following linear model $$b=w_0+w_1 a_1+\ldots+w_L a_L,$$

between a matrix A of a number of records m and a number of attributes L and a vector b of the number of records m held by a registered terminals $T_H$, the cyphertext generation device is the registered terminals $T_H$, the secret computation device is n secret computation servers $M_1, \ldots, M_n$, the computation device is an analysis terminal $T_A$, cyphertext of "x" is described as $[x]=([x]_1, \ldots, [x]_n)$, provided that $i=1, \ldots, n$, the registered terminals $T_H$ generates $[A]_i$, $[b]_i$, $[m]_i$, and $[L]_i$ as the cyphertext and transmit $[A]_i$, $[b]_i$, $[m]_i$, $[L]_i$, and plaintext m and L to the secret computation servers $M_i$, such that each of the secure computation servers $M_i$ receives, over the network, an input of one or more respective shares of original data A and b, and the data A and b are concealed from each of the secure computation servers, provided that $i=1, \ldots, n$, $A=(a_{j,k})_{1\leq j\leq m, 1\leq k\leq L}$, $q=1, \ldots, L$, $s_{aq}=\Sigma_{j=1}^m a_{j,q}$, $s_{aqb}=\Sigma_{r=1}^m a_{r,q} b_r$, $b=(b_1, \ldots, b_m)$, $s_b=\Sigma_{j=1}^m b_j$ and $S_{ajak}=\Sigma_{r=1}^m a_{r,j} a_{r,k}$ the secret computation servers $M_i$ generates $[S_A]_i=([S_{a1}]_i)$, $[S_b]_i$, $[S_A]_i=([S_{ajak}]_i)_{1\leq j,k\leq L}$ and $[S_{Ab}]_i=([S_{a1b}]_i, \ldots, [S_{aLb}]_i)$ as the basic statistics and transmits $[S_A]_i$, $[S_b]_i$, $[S_A]_i$, and $[S_{Ab}]_i$, $[m]_i$ and $[L]_i$ to the analysis terminal $T_A$, the analysis terminal TA solves Formula (1) to find $W=(W_0, \ldots, W_L)$ $$\begin{pmatrix} m & s_{a_1} & \cdots & s_{a_L} \\ s_{a_1} & s_{a_1^2} & \cdots & s_{a_1 a_L} \\ \vdots & \vdots & \ddots & \vdots \\ s_{a_L} & s_{a_L a_1} & \cdots & s_{a_L a_L} \end{pmatrix} \begin{pmatrix} w_0 \\ w_1 \\ \vdots \\ w_L \end{pmatrix} = \begin{pmatrix} s_b \\ s_{a_1 b} \\ \vdots \\ s_{a_L b} \end{pmatrix}. \quad (1)$$

4. A secret computation system for performing computation while keeping data concealed, comprising:

a cyphertext generation device that generates cyphertext by encrypting the data;

a secret computation device that generates encrypted basic statistics by performing secret computation of predetermined basic statistics using the cyphertext while keeping the cyphertext concealed from the secret computation device; and a computation device that generates decrypted basic statistics by decrypting the encrypted basic statistics and performs predetermined computation using the decrypted basic statistics, wherein the cyphertext generation device, the secret computation device, and the computation device communicate with each other over a network, and wherein the predetermined computation is a computation for performing principal component analysis for data A which is a matrix of a number of records m and a number of attributes L held by a registered terminals $T_H$, the cyphertext generation device is the registered terminals $T_H$, the secret computation device is n secret computation servers $M_1, \ldots, M_n$, the computation device is an analysis terminal $T_A$, cyphertext of "x" is described as $[x]=([x]_1, \ldots, [x]_n)$, provided that i=1, . . . ,n, the registered terminals $T_H$ generates $[A]_i$, $[m]_i$, and $[L]_i$ as the cyphertext and transmit $[A]_i$, $[m]_i$ and $[L]_i$ and plaintext m and L to the secret computation servers $M_i$, such that each of the secure computation servers $M_i$ receives, over the network, an input of one or more respective shares of original data A, and the data A are concealed from each of the secure computation servers, provided that i=1, . . . ,n, $A=(a_{j,k})_{1\leq j\leq m,\ 1\leq k\leq L}$, q=1,...,L, $S_{aj}=\Sigma_{j=1}^{m}a_{q,j}$ and $S_{ajak}=\Sigma_{r=1}^{m}a_{r,j}a_{r,k}$, the secret computation servers $M_i$ generates $[s]_i=([s_{a1}]_i, \ldots, [s_{aL}]_i)$ and $[S]_i=([s_{ajak}]_i)_{1\leq j,k\leq L}$ as the basic statistics and transmits $[s]_i$, $[S]_i$, $[m]_i$ and $[L]_i$ to the analysis terminal $T_A$, and provided that $\sigma_{aj}^2=(1/m)s_{aj\wedge 2}-(1/m^2)s_{aj}^2$, $\sigma_{ak}^2=(1/m)s_{ak\wedge 2}-(1/m^2)s_{ak}^2$ the analysis terminal $T_A$ generates s, S, m and L as the decrypted basic statistics, calculates $V=(\sigma_{aj,ak})_{1\leq j,k\leq L}=((1/m)s_{ajak}-(1/m^2)s_{aj}s_{ak})_{1\leq j,k\leq L}$, $C=((\sigma_{aj,ak})/(\sigma_{aj}^2\sigma_{ak}^2)^{1/2})_{1\leq j,k\leq L}$ and performs computation of eigenvalues and eigenvectors for C to find $p=(p_1, \ldots, p_L)$, which are the principal components for data A.

5. A secret computation method for performing computation while keeping data concealed, comprising:

a cyphertext generation step in which a cyphertext generation device generates cyphertext by encrypting the data;

a secret computation step in which a secret computation device generates encrypted basic statistics by performing secret computation of predetermined basic statistics using the cyphertext while keeping the cyphertext concealed from the secret computation device; and a computation step in which a computation device generates decrypted basic statistics by decrypting the encrypted basic statistics and performs predetermined computation using the decrypted basic statistics, wherein the cyphertext generation device, the secret computation device, and the computation device communicate with each other over a network, and wherein the predetermined computation is a computation for estimating a parameter $w=(w_0,w_1, \ldots, w_L)$ for the following linear model $$b=w_0+w_1a_1+\ldots+w_La_L$$

between a matrix A of a number of records m and a number of attributes L and a vector b of the number of records m held by a registered terminals $T_H$, the cyphertext generation device is the registered terminals $T_H$, the secret computation device is n secret computation servers $M_1, \ldots, M_n$, the computation device is an analysis terminal $T_A$, cyphertext of "x" is described as $[x]=([x]_1, \ldots, [x]_n)$, provided that i=1, . . . ,n, the registered terminals $T_H$ generates $[A]_i$, $[b]_i$, $[m]_i$, and $[L]_i$ as the cyphertext and transmit $[A]_i$, $[m]_i$ and $[L]_i$ and plaintext m and L to the secret computation servers $M_i$, such that each of the secure computation servers M receives, over the network, an input of one or more respective shares of original data A and b, and the data A and b are concealed from each of the secure computation servers, provided that provided that i=1, . . . ,n, $A=(a_{j,k})_{1\leq j\leq m,\ 1\leq k\leq L}$, q=1, . . . ,L, $S_{aq}=\Sigma_{j=1}^{m}a_{j,q}$, $S_{aqb}=\Sigma_{r=1}^{m}a_{r,q}b_r$, $b=(b_1, \ldots, b_m)$ $S_b=\Sigma_{j=1}^{m}a_{bj}$ and $S_{ajak}=\Sigma_{r=1}^{m}a_{r,j}a_{r,k}$, the secret computation servers $M_i$ generates $[s_A]_i=([s_{a1}]_i, \ldots, [s_{aL}]_i), [S_b]_i$, $[SA]_i=([s_{ajak}]_i)_{1\leq j,k\leq L}$ and $[S_{Ab}]_i=([S_{a1b}]_i, \ldots, [S_{aLb}]_i)$ as the basic statistics and transmits $[s_A]_i$, $[sb]_i$, $[S_A]_i$, and $[s_{Ab}]_i$, $[m]_i$, and $[L]_i$, to the analysis terminal $T_A$, the analysis terminal TA solves Formula (1) to find $w=(w_0, \ldots, w_L)$ $$\begin{pmatrix} m & s_{a_1} & \cdots & s_{a_L} \\ s_{a_1} & s_{a_1^2} & \cdots & s_{a_1 a_L} \\ \vdots & \vdots & \ddots & \vdots \\ s_{a_L} & s_{a_L a_1} & \cdots & s_{a_L a_L} \end{pmatrix} \begin{pmatrix} w_0 \\ w_1 \\ \vdots \\ w_L \end{pmatrix} = \begin{pmatrix} s_b \\ s_{a_1 b} \\ \vdots \\ s_{a_L b} \end{pmatrix}. \quad (1)$$

6. A secret computation method for performing computation while keeping data concealed, comprising:

a cyphertext generation step in which a cyphertext generation device generates cyphertext by encrypting the data;

a secret computation step in which a secret computation device generates encrypted basic statistics by performing secret computation of predetermined basic statistics using the cyphertext while keeping the cyphertext concealed from the secret computation device; and a computation step in which a computation device generates decrypted basic statistics by decrypting the encrypted basic statistics and performs predetermined computation using the decrypted basic statistics, wherein the cyphertext generation device, the secret computation device, and the computation device communicate with each other over a network, and wherein the predetermined computation is a computation for performing principal component analysis for data A which is a matrix of a number of records m and a number of attributes L held by a registered terminals $T_H$, the cyphertext generation device is the registered terminals $T_H$, the secret computation device is n secret computation servers $M_1, M_n$, the computation device is an analysis terminal $T_A$, cyphertext of "x" is described as $[x]=([x]_1, \ldots, [x]_n)$, provided that i=1, . . . ,n, the registered terminals $T_H$ generates $[A]_i$, $[m]_i$, and $[L]_i$ as the cyphertext and transmit $[A]_i$, $[m]_i$ and $[L]_i$ and plaintext m and L to the secret computation servers $M_i$, such that each of the secure computation servers $M_i$ receives, over the network, an input of one or more respective shares of original data A, and the data A are concealed from each of the secure computation servers, provided that i=1, . . . ,n, $A=(a_{j,k})_{1\leq j\leq m,\ 1\leq k\leq L}$, q=1,...,L, $S_{ai}=\Sigma_{j=1}^{m}a_{q,j}$ and $S_{ajak}=\Sigma_{r=1}^{m}a_{r,j}a_{r,k}$, the secret computation servers $M_i$ generates $[s]_i=([s_{a1}]_i, \ldots, [s_{aL}]_i)$ and $[S]_i=([s_{ajak}]_i)_{1\leq j,k\leq L}$ as the basic statistics and transmits $[s]_i$, $[S]_i$, $[m]_i$ and $[L]_i$ to the analysis terminal $T_A$, and provided that $\sigma_{aj}^2=(1/m)s_{aj\wedge 2}-(1/m^2)s_{aj}^2$, $\sigma_{ak}^2=(1/m)s_{ak\wedge 2}-(1/m^2)s_{ak}^2$ the analysis terminal $T_A$ generates s, S, m and L as the decrypted basic statistics, calculates $V=(\sigma_{aj,ak})_{1\leq j,k\leq L}=((1/m)s_{ajak}-(1/m^2)s_{aj}s_{ak})_{1\leq j,k\leq L}$, $C=((\sigma_{aj,ak})/(\sigma_{aj}^2 ak^2)^{1/2})_{1\leq j,k\leq L}$ and performs computation of eigenvalues and eigenvectors for C to find $p=(p_1,\ldots,p_L)$, which are the principal components for data A.

\* \* \* \* \*

UNITED STATES PATENT AND TRADEMARK OFFICE
CERTIFICATE OF CORRECTION

PATENT NO. : 11,537,726 B2
APPLICATION NO. : 16/772543
DATED : December 27, 2022
INVENTOR(S) : Satoshi Tanaka et al.

It is certified that error appears in the above-identified patent and that said Letters Patent is hereby corrected as shown below:

In the Claims

Claim 5, Column 12, Line 1, change "computation servers, provided that provided that i=" to -- computation servers, provided that i= --.

Signed and Sealed this
Fourth Day of July, 2023

Katherine Kelly Vidal
*Director of the United States Patent and Trademark Office*